March 4, 1958    R. M. BUCKERIDGE ET AL    2,825,860
MULTI-MOTOR STARTING CIRCUIT Filed Sept. 24, 1956    3 Sheets-Sheet 3

Fig. 3

INVENTORS
Roger M. Buckeridge
BY    Claude O. Wood

Murray A. Gleeson
ATTORNEY

////

United States Patent Office 2,825,860
Patented Mar. 4, 1958

2,825,860

MULTI-MOTOR STARTING CIRCUIT

Roger M. Buckeridge, Downers Grove, and Claude O. Wood, Chicago, Ill., assignors to Goodman Manufacturing Company, Chicago, Ill., a corporation of Illinois Application September 24, 1956, Serial No. 611,674

8 Claims. (Cl. 318—103)

This invention relates to starting circuits for motors and more particularly relates to a starting circuit for starting more than one alternating current motor directly across the line.

Heretofore, alternating current motors, and particularly motors drawing heavy current loads such as are commonly used for operating heavy machinery, such as loading machines or combined mining and loading machines and the like in mines underground, have been started directly across the line. While one motor may satisfactorily be started in this manner, where the machine has more than one motor and one motor is running and the second motor is started across the line, the second motor frequently lowers the voltage to such an extent that energization of the holding coil for the first motor is so weakened that it does not have sufficient magnetic force to hold the contacts holding the first motor in the circuit closed, with the result that the contacts drop out and first motor drops out of the line.

In operation of such machines, the second motor has been started after the starting of the first motor, by manually holding the starting switch for the first motor closed while closing the starting switch for the second motor. Such a starting system, however, is very unsatisfactory.

A principal object of the invention is to provide a starting circuit for a plurality of alternating current motors, enabling one motor to be started directly across the line after the starting of a first motor, without de-energizing the energizing circuit to the first motor.

A further object of the invention is to provide a starting circuit for more than one motor connected to a source of alternating current through normally open contacts, closed by holding coils connected in the energizing circuit at line voltage, wherein the windings of the holding coil are for less than line voltage and are connected in series with a current limiting resistor during running of the motors, and wherein means are provided for energizing the holding coils for the contacts for the two motors at line voltage as the second motor is started, to provide sufficient voltage to hold the first holding coil from being deenergized by the heavy starting load required for starting the second motor.

A still further object of the invention is to provide a starting circuit for a plurality of motors wherein each motor is started by the energization of a holding coil directly across the line, wherein the holding coils are held energized through current limiting resistors during running, and wherein interconnecting lines are provided between the holding coils to by-pass the resistors and energize the two holding coils at line voltage during the starting of a next succeeding motor.

These and other objects of the invention will appear from time to time as the following specification proceeds and with reference to the accompanying drawings wherein:

Figure 3 is a schematic wiring diagram illustrating the application of the circuit of the invention to the starting of more than two motors.

Figure 1:
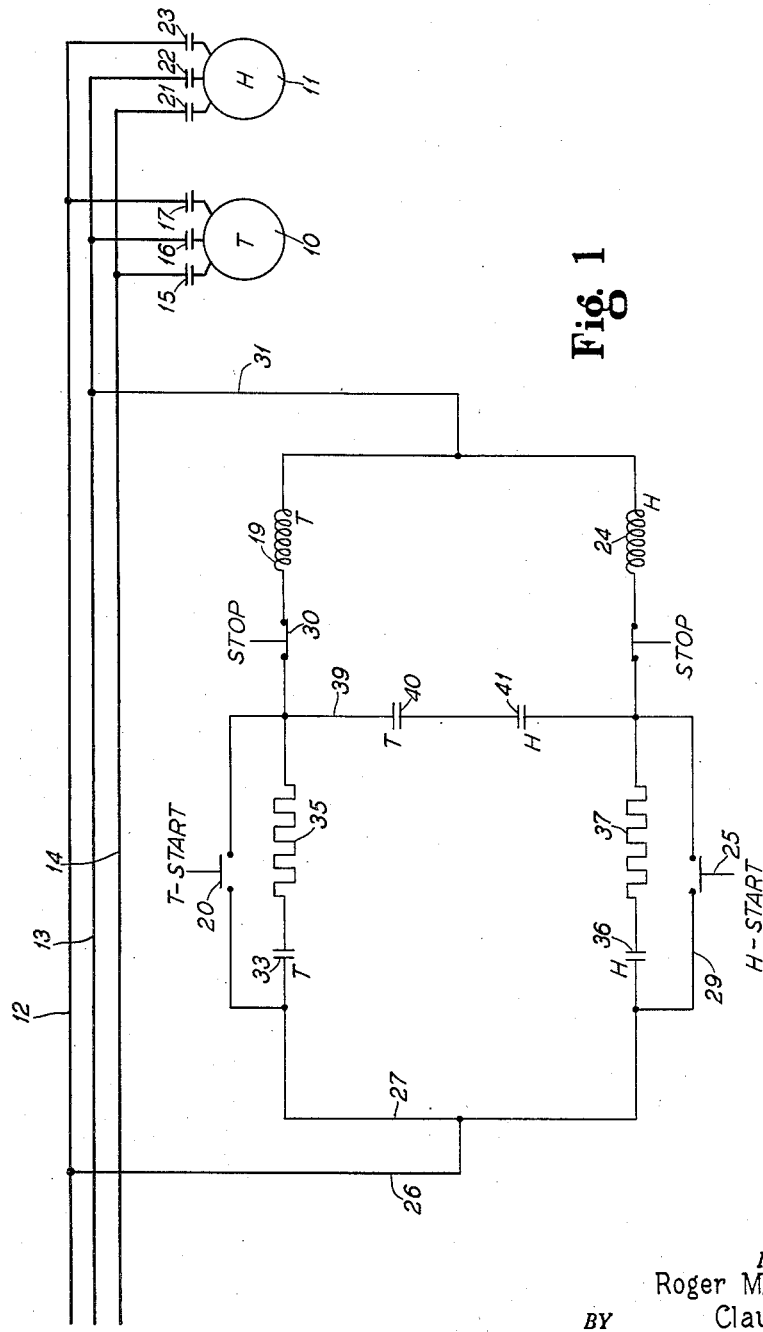
Figure 1 is a schematic wiring diagram illustrating one form in which the invention may be embodied and showing the circuits to the motors open.

In the embodiment of the invention illustrated in Figure 1 of the drawings, two alternating current motors 10 and 11 are diagrammatically shown. The motor 10 may be a tramming motor for a loading machine, for feeding the machine into the material to be picked up during the loading operation and for tramming the machine from working place to working place. The motor 11 may be a drive motor for the gathering mechanism and conveyor of the machine and is usually started and stopped independently of starting and stopping of the tramming motor. The motors 10 and 11 may be well-known forms of heavy duty alternating current motors such as are commonly used to operate loading machines, mining machines or combined mining and loading machines in mines underground, and are no part of the present invention so need not herein be shown or described further.

Main line conductors 12, 13 and 14, which may be connected with a source of supply of alternating current are shown as supplying current to the two motors 10 and 11, herein shown as being connected to said main line conductors in parallel.

The connection from the main line conductors 12, 13 and 14 to the motor 10 includes sets of contacts 15, 16 and 17 in the respective main line conductors 12, 13 and 14 and closing and held closed, to complete a circuit through the main line conductors 12, 13 and 14 upon the energization of a holding coil 19, suitably connected with said contacts and energized directly at line voltage upon the closing of a manually operable starting switch 20.

The motor 11 is energized through sets of contacts 21, 22 and 23, closing to complete an energizing circuit to said motor through the main line conductors 12, 13 and 14 upon the energization of a holding coil 24, suitably connected with said contacts and initially energized through a manually operable starting switch 25.

The alternating current circuit may for the purpose of describing the present invention be a 440-volt circuit while the holding coils 19 and 24 may be wound for substantially less than 440 volts, as for example 220 volts alternating current.

The respective motors 10 and 11, holding coils 19 and 24, and the contacts closed and held closed thereby are herein designated by letters T and H in addition to the individual reference numerals applied thereto, to show at a glance the association between the motors and their associated holding coils and contacts. Said holding coils and the contacts closed thereby may be of any well known form, so need not be shown or described in detail herein.

In starting the tramming motor 10 the manually operable starting switch 20 is closed and is maintained closed as long as the hand is held on the switch. This will establish an energizing circuit to the holding coil 19 through a conductor 26 connected with the main line conductor 12, a conductor 27, the contacts of the starting switch 20, a normally closed stop switch 30 operable to stop the motor 10, the coil 19 and a conductor 31 connected with the main line conductor 13.

Energization of the holding coil 19 will close the contacts 15, 16 and 17. The motor 10 will then start. Energization of the holding coil 19 will also close a set of contacts 33 connecting the conductor 27 with a resistor 35 connected in series with the holding coil 19. The resistor 35 may be a voltage limiting resistor and is provided to reduce the voltage through the holding coil 19 to the voltage for which said coil is wound during running of the motor 10. The resistor 35 comes into the circuit as soon as the hand is removed from the manually operable starting switch 20.

The holding coil 19 is thus energized at line voltage upon closing of the starting switch and as long as the starting switch is closed. The holding coil 19, however, is so wound that it can stand full line voltage during the short period required to start the motor 10, which may be a matter of a few seconds.

The motor 11 is started in the same manner as the motor 10, by manually closing the starting switch 25 and holding said starting switch closed to energize the holding coil 24 at line voltage, and by then removing the hand from the starting switch to hold the holding coil 24 energized through a set of contacts 36 operatively connected with said holding coil and closing upon energization thereof, and a voltage limiting resistor 37 in series with said holding coil, and limiting the voltage passing through said holding coil during running of the motor 11 to the voltage for which said coil is wound.

With the circuit just described, upon starting of the motor 11 after the motor 10 has started, the load as the motor 11 is thrown across the line may be so great that the holding coil 19 will be weakened to the extent that the contacts 15, 16 and 17 will open if the starting switch 20 is not held in by the hand as the starting switch 25 is closed.

In order to avoid the necessity of holding in the two starting switches by the hand when starting one motor after the other motor is running, the holding coils 19 and 24 are connected in parallel during the starting of the second motor and the resistors 35 and 37 are short circuited from the energizing circuit, as the second motor is starting during running of the first motor. This is attained by connecting the conductors energizing the holding coils 19 and 24 together by an inter-connect line 39 having sets of contacts 40 and 41 therein. The set of contacts 40 closes upon energization of the holding coil 19 and closing of the contacts 15, 16, 17 and 33. The set of contacts 41 closes upon energization of the holding coil 24 and closing of the contacts 21, 22, 23 and 36. Thus when the motor 10 starts and is running and it is desired to start the motor 11, the starting switch 25 will be manually closed and held closed to energize the holding coil 24. This will close the sets of contacts 21, 22, 23, 36 and 41. The motor 11 will then start. As the motor 11 is started, however, the inter-connect line 39 and the contacts 40 and 41 will establish a parallel energizing circuit to the holding coils 19 and 24, energizing both of said holding coils at line voltage. Since, however, the two holding coils 19 and 24 are wound for substantially less than line voltage, the current drop caused by the load of starting the second motor, as the first motor is in operation, will not be sufficient to weaken the strength of the holding coil 19 to the extent that the contacts held closed by said holding coil will open or drop out, to deenergize or drop the first motor out of the line.

Figure 2:
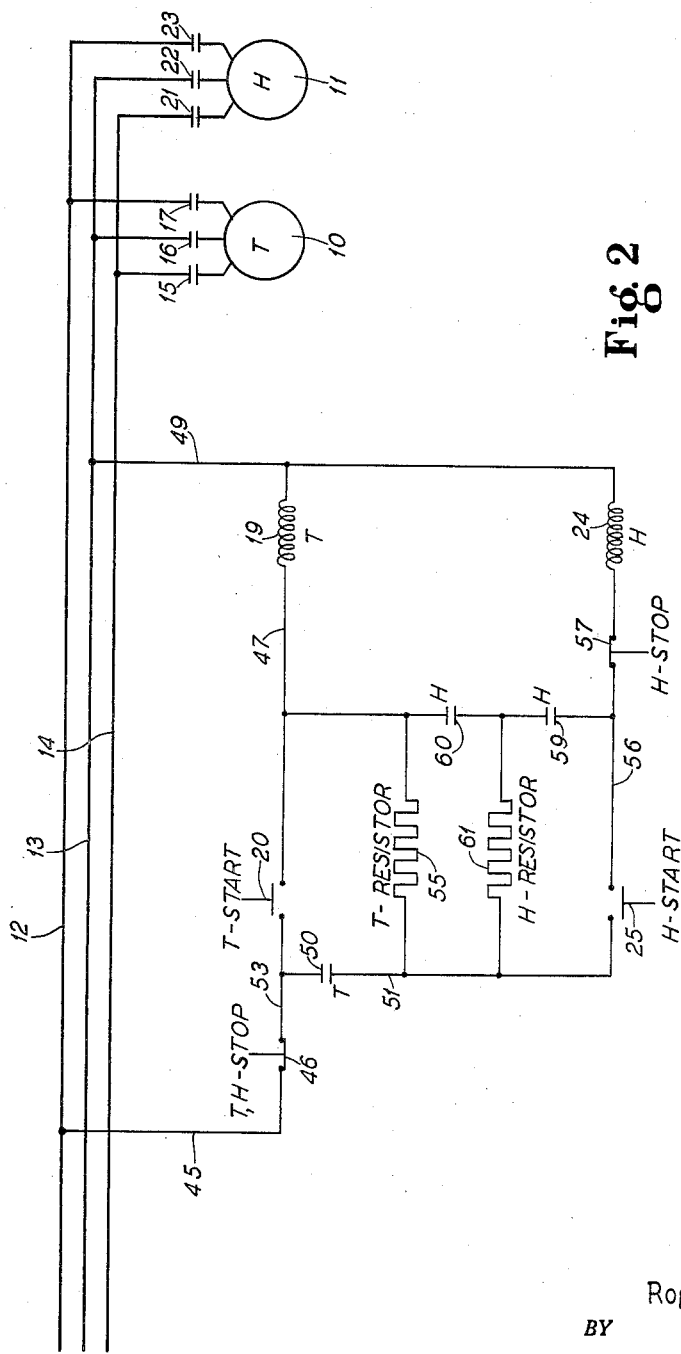
Figure 2 is a schematic wiring diagram illustrating a modified form in which my invention may be embodied.

In the form of the invention illustrated in Figure 2 we have shown a starting circuit in which the motor 10 must always be started first and in which the second motor 11 is stopped when the first motor is stopped, but may be stopped at any time during operation of the first motor. This is of particular advantage where the motor 10 serves as a tramming motor and the other motor drives other operative parts of the machine. In this form of the invention like part numbers will be applied to similar parts to which they were applied in Figure 1.

In starting the motor 10, the manual starting switch 20 is first closed and manually held closed. This will establish an energizing circuit to the holding coil 19 through a conductor 45 connected with the conductor 12, a manually operable stop switch 46, the start switch 20 a conductor 47 connecting said start switch with the holding coil 19 and a conductor 49 connecting the holding coil 19 to the conductor 13. Energization of the coil 19 will close contacts 15, 16, 17 and 50. The contacts 50 are shown as being connected in a conductor 51, connected between a conductor 53, connecting the stop switch 46 with the start switch 20, and the start switch 25 for starting the motor 11. A resistor 55 is energized upon closing of the contacts 50 and is connected in series with the holding coil 19, to limit the running voltage through said holding coil to the voltage for which said coil is wound, as long as the motor 10 is in operation.

When it is desired to start the motor 11, the manually operable starting switch 25 is closed and held closed. This will complete a circuit from the conductor 51 through a conductor 56, a stop switch 57, the holding coil 24 to the main line conductor 13 through the conductor 49. This will energize the holding coil 24 and close the contacts 21, 22 and 23. It will also close contacts 59 and 60. The contacts 59 serve to connect a voltage limiting resistor 61 in series with the holding coil 24 to reduce the voltage passing through said holding coil to the voltage for which said holding coil is wound, during running of the motor 11. Closing of the contacts 60 will connect the conductor 56 with the conductor 47 and shunt the resistors 55 and 61 out of the circuit. The holding coils 19 and 24 will then be connected in parallel and each holding coil will have full line voltage passing therethrough during starting of the motor 11, after the motor 10 has first been started.

Thus, as in the form of the invention illustrated in Figure 1 the low voltage holding coil 19 will not become weakened by the voltage drop occasioned by the starting of the motor 11, for even though the motor 11 should start under a heavy load, there will always be sufficient voltage in the line to maintain the holding coil 19 energized with sufficient strength to hold the motor 10 connected in the line. As soon as the hand is removed from the starting switch 25, the resistors 55 and 61 will be connected in series with the respective holding coils 19 and 24 and the voltage passing through said holding coils will be maintained at substantially the voltage for which said coils are wound.

In Figure 3 we have shown the starting circuit of Figure 1 adapted to start more than two motors. In this figure, motors 70, 71, 72, 73 and 74 are connected in parallel to the main line conductors 12, 13 and 14 through sets of contacts 75, 76, 77, 78 and 79, closed and held closed upon the energization of respective holding coils 80, 81, 82, 83 and 84. In this form of the invention, the respective motors 70, 71, 72, 73 and 74, holding coils 80, 81, 82, 83 and 84 and contacts closed upon energization of said holding coils are designated by reference letters A, B, C, D and E respectively to indicate the association between said motors holding coils and contacts.

The respective holding coils 80, 81, 82, 83 and 84 are operable to close sets of contacts 85, 86, 87, 88 and 89 upon energization of the respective holding coils, which sets of contacts respectively connect resistors 90, 91, 92, 93 and 94 in the circuit to the respective holding coils 80, 81, 82, 83 and 84 upon starting of the respective motors by closing the starting switches therefor, and then releasing the hand from the associated switch.

It will be seen that in this form of the invention, after one motor is started, and a starting switch is closed to start any one of the next succeeding motors, that in each instance the contacts 85 or any of the next succeeding contacts will connect the respective holding coils to take full line voltage. Thus, after one motor has started, any succeeding motor may be started by merely closing the required manually operable starting switch, and since the holding coils are wound to hold their respective contacts closed at substantially less voltage than main line voltage, that the first motor to start will be held in operation by its holding coil regardless of the starting load on the next succeeding motor to start.

It may be seen from the foregoing that we have provided a distinctly novel and efficient starting circuit for starting at least two alternating current motors by starting the motors by connecting them directly into the main line, in which each motor has a holding coil for maintaining it energized after the manual start switch is released, which holding coils are wound to maintain their contacts closed at less voltage than full line voltage; wherein resistors are connected in series with the holding coils after starting to reduce the voltage passing through the coils to the voltage for which the holding coils are wound, and wherein interconnecting lines are connected between the resistors through contacts closed upon energization of the respective holding coils, to shunt the resistors out of the circuit during starting of the next succeeding motor and apply full line voltage to the respective holding coils for the motors, to assure that the holding coil for the first motor to be started is supplied with ample voltage to keep its motor running without requiring its start switch to be manually held closed.

It will be understood that while we have herein shown and described a number of forms in which the invention may be embodied, that various other modifications and variations of the invention may be effected without departing from the spirit and scope of the novel concepts thereof.

We claim as our invention:

1. In a starting circuit for starting at least two alternating current motors in succession directly across a main line circuit at line voltage, a manually operable starting switch for each motor, opening upon the release of said starting switch, a holding coil for each starting switch and motor energizable upon closing of the respective starting switch, to connect the associated motor directly across the main line circuit and to hold the motor in the circuit upon opening of the starting switch, a voltage reducing resistance in series with each holding coil, for reducing the voltage passing through the holding coil during running of the associated motor, and means for decreasing the resistance in the circuit to the holding coil for the running motor upon closing of the starting switch for a second motor to start, to apply full line voltage to the holding coils for the starting and running motors and apply sufficient voltage to the energizing circuit to the holding coil for the first motor to start to maintain said holding coil effective to hold the first motor to start energized.

2. In a starting circuit for a machine having at least two alternating current motors, a plurality of main line conductors, normally open contacts connecting said conductors with said motors, a separate control circuit for each motor including a manually operable switch, a separate holding coil in each control circuit, energizable to effect energization of an associated motor upon closing of its associated starting switch, and to hold said motor energized, a resistance in series with each holding coil for reducing the line voltage normally passing through said holding coil, and a bridging circuit short circuiting said resistors out of the circuits to said holding coils and providing sufficient voltage to the holding coil holding the first motor to start running, to maintain said first motor energizing during the starting of the second motor.

3. In a starting circuit for a machine having at least two alternating current motors, a plurality of main line conductors, a plurality of sets of contacts connecting said conductors with said motors, a separate control circuit for each motor including a manually operable starting switch opening its contacts upon release of the switch, a separate holding coil in each control circuit energizable upon closing of the associated switch, to close the sets contacts for an associated motor to energize said motor and to maintain said motor energized, each holding coil being wound for less line voltage than the main line voltage flowing through said conductors, a voltage reducing resistor in series with each holding coil for reducing the main line voltage to the voltage for which each holding coil is wound, and a bridging circuit connected between said resistors and said holding coils and operable upon the closing of the second starting switch and the holding coil energized thereby, to provide sufficient line voltage to the coil holding the first motor to start running, to maintain said motor energized regardless of the voltage drop occasioned by a starting of the second motor.

4. In a starting circuit for a machine having at least two alternating current motors, a plurality of main line conductors, normally open sets of contacts connecting said conductors with said motors, a control circuit for each motor for closing said sets of contacts to start said motors and maintain said motors in a running condition comprising a manually operable starting switch opening its contacts upon the release of manual pressure thereon, a separate holding coil in each control circuit energizable to close the contacts for an associated motor, said holding coils being wound for less line voltage than the line voltage flowing through said main line conductors, a resistance connected in series with each holding coil upon the release of each starting switch, for reducing the line voltage normally passing through each coil, and means operable upon the running of one motor and the starting of a second motor by closing the starting switch therefor, for interconnecting said holding coils and deenergizing said resistors, to energize said holding coils in parallel at full line voltage during starting of the second motor and to thereby supply sufficient voltage to the first holding coil to hold said first motor in the circuit during starting of the second motor.

5. In a starting circuit for a machine having at least two alternating current motors, a main line alternating current circuit, normally open sets of contacts connecting said motors in said main line circuit, a manually operable starting switch for each motor, opening upon the release of manual pressure from said switch, a separate holding coil for each motor energizable upon the closing of an associated starting switch to close the contacts for an associated motor, to energize said motor, each holding coil having windings requiring substantially less than full line voltage to hold the associated contacts closed, a separate holding circuit for each motor by-passing each starting switch and providing an energizing circuit for maintaining each holding coil energized, a voltage reducing resistor in each holding circuit, and means interconnecting said holding coils and cutting said resistors out of the circuits thereto upon the closing of the starting switch for starting a second motor and thereby applying full line voltage to each holding coil to maintain sufficient voltage to the holding coil for the first motor to start to maintain said motor energized as the second motor is started.

6. In a starting circuit for a machine having at least two motors, a main line circuit, normally open sets of contacts connecting said motors in said main line circuit, a manually operable starting switch for each motor, opening upon the release of pressure from said switch, a separate holding coil for each motor energizable upon the closing of an associated starting switch to close the contacts for an associated motor, to energize said motor, each holding coil having windings requiring substantially less than full line voltage, a separate holding circuit for each motor by-passing each starting switch and providing an energizing circuit for maintaining each holding coil energized, a voltage reducing resistor in each circuit, and means interconnecting said holding coils and cutting said resistors out of the circuits thereto upon closing of the starting switch for starting a second motor and applying full line voltage to each holding coil as long as said starting switch is closed, to maintain sufficient voltage to the holding coil for the first motor to maintain said first motor energized as the second motor is started comprising a conductor connected between said resistors on the supply sides of said holding coils and two sets of normally open contacts in said conductor, one set closing upon the energization of the first holding coil and the other set closing upon the energization of the second holding coil.

7. In a starting switch for a machine having at least two motors, a main line circuit, normally open sets of contacts connecting said motors in said main line circuit, a manually operable starting switch for each motor, opening upon the release of pressure from said switch, a separate holding coil for each motor energizable upon the closing of the associated starting switch to close the contacts for an associated motor, to energize said motor, each holding coil having windings requiring less than full line voltage, a separate holding circuit for each motor by-passing each starting switch and providing an energizing circuit for maintaining each holding coil energized, a voltage reducing resistor in each circuit for maintaining said holding coils energized at the voltage of the windings thereof, and means interconnecting said holding coils and cutting said resistors out of the circuits thereto upon the closing of the starting switch for starting a second motor and applying full line voltage to each holding coil to maintain sufficient voltage to the holding coil for the first motor to start to maintain said first motor energized as the second motor is started comprising first and second conductors having said resistors connected thereacross, contacts closing upon the energization of said first holding coil for connecting said resistors in the energizing circuit through said first conductor, and a set of contacts in said second conductor connecting said resistors together upon the energization of the holding coil for the second motor and cutting said resistors out of the energizing circuits to said holding coils and, connecting said holding coils for energization at line voltage upon the closing of said last mentioned set of contacts, as long as the starting switch for said second motor is held closed.

8. In an alternating current motor starting circuit, a plurality of alternating current motors, a main line circuit, normally open sets of contacts connecting said motors in said main line circuit, a manually operable starting switch for each motor, opening upon the release of pressure from said switch, a separate holding coil for each motor energizable upon closing of an associated starting switch to close the contacts for an associated motor, to energize said motor, each holding coil having windings requiring substantially less voltage than full line voltage, a separate holding circuit for each motor by-passing each starting switch and providing an energizing circuit for maintaining each holding coil energized, a voltage reducing resistor in each holding circuit, and means interconnecting said holding coils, and cutting said resistors out of the circuits thereto upon the closing of the starting switch for starting a second motor, and applying full line voltage to each holding coil to maintain sufficient voltage to the holding coil for the first motor to start, to maintain said first motor energized as the second motor is started as long as the starting switch for said second motor is held closed, comprising first and second conductors having said resistors connected thereacross, contacts in said first conductor closing upon energization of said first holding coil for connecting one of said resistors in series with an associated holding coil to reduce the voltage to said holding coil, and two sets of contacts in a second of said conductors, each closing upon energization of the holding coil for energizing a second motor, one connecting the resistor associated with the second holding coil and motor in series with said holding coil and the other connecting said resistors together and cutting said resistors out of the circuits to the associated holding coils upon the closing of the starting switch for starting the second motor, and thereby supplying full line voltage to each holding coil as long as said starting switch is closed.

References Cited in the file of this patent
UNITED STATES PATENTS 1,743,754   Bryson ---------------- Jan. 14, 1930